(12) United States Patent
Biskeborn et al.

(10) Patent No.: US 9,911,440 B2
(45) Date of Patent: Mar. 6, 2018

(54) DIFFERING MAGNETIC READ SENSORS ON A MAGNETIC HEAD

(71) Applicant: International Business Machines Corporation, Armonk, NY (US)

(72) Inventors: Robert G. Biskeborn, Hollister, CA (US); Peter VanderSalm Koeppe, San Diego, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/215,487

(22) Filed: Jul. 20, 2016

(65) Prior Publication Data

US 2016/0329065 A1 Nov. 10, 2016

Related U.S. Application Data

(63) Continuation of application No. 14/527,707, filed on Oct. 29, 2014, now Pat. No. 9,449,622.

(51) Int. Cl.
*G11B 5/39* (2006.01)
*G11B 5/40* (2006.01)
*G11B 5/008* (2006.01)

(52) U.S. Cl.
CPC ........ *G11B 5/3948* (2013.01); *G11B 5/00821* (2013.01); *G11B 5/3909* (2013.01); *G11B 5/3945* (2013.01); *G11B 5/3951* (2013.01); *G11B 5/3958* (2013.01); *G11B 5/40* (2013.01); *G11B 5/3977* (2013.01); *G11B 2005/3996* (2013.01)

(58) Field of Classification Search
CPC ... G11B 5/3945; G11B 5/3948; G11B 5/3951; G11B 5/40
USPC .................................................. 360/316, 122
See application file for complete search history.

(56) References Cited

U.S. PATENT DOCUMENTS

| | | | |
|---|---|---|---|
| 6,169,306 | B1 | 1/2001 | Gardner et al. |
| 6,185,071 | B1 | 2/2001 | Asanai et al. |
| 6,288,870 | B1 | 9/2001 | Saliba |
| 6,744,594 | B2 | 6/2004 | Denison et al. |
| 6,759,081 | B2 | 7/2004 | Huganen et al. |
| 6,787,369 | B2 | 9/2004 | Ishii et al. |
| 6,822,817 | B2 | 11/2004 | Chung et al. |

(Continued)

FOREIGN PATENT DOCUMENTS

| | | |
|---|---|---|
| EP | 0821348 A2 | 1/1998 |
| EP | 1378891 A1 | 1/2004 |

(Continued)

OTHER PUBLICATIONS

Restriction Requirement from U.S. Appl. No. 14/527,713, dated Oct. 1, 2015.

(Continued)

*Primary Examiner* — Jefferson Evans
(74) *Attorney, Agent, or Firm* — Zilka-Kotab, P.C.

(57) ABSTRACT

An apparatus according to one embodiment includes a magnetic head having multiple magnetic transducers, the transducers including read sensors. The read sensors are of at least two differing types selected from a group consisting of tunneling magnetoresistance (TMR), giant magnetoresistance (GMR), anisotropic magnetoresistance (AMR), and inductive sensors.

17 Claims, 11 Drawing Sheets

(56) References Cited

U.S. PATENT DOCUMENTS

| | | |
|---|---|---|
| 6,826,020 B2 | 11/2004 | Daby et al. |
| 6,985,385 B2 | 1/2006 | Nguyen et al. |
| 7,161,771 B2 * | 1/2007 | Lin ................... B82Y 10/00 |
| | | 360/314 |
| 7,211,195 B2 | 5/2007 | Cyrille et al. |
| 7,400,474 B2 | 7/2008 | Biskeborn et al. |
| 7,405,907 B2 | 7/2008 | Raastad |
| 7,502,193 B2 | 3/2009 | Albrecht et al. |
| 7,551,393 B2 | 6/2009 | Biskeborn et al. |
| 7,602,193 B1 | 10/2009 | Baird et al. |
| 7,623,325 B2 | 11/2009 | Jayasekara |
| 7,684,148 B2 | 3/2010 | Biskeborn |
| 7,751,148 B1 | 7/2010 | Alstrin et al. |
| 8,164,987 B2 | 4/2012 | Gill et al. |
| 8,373,948 B2 | 2/2013 | Zeltser |
| 8,736,996 B2 | 5/2014 | Che et al. |
| 8,780,496 B2 | 7/2014 | Biskeborn et al. |
| 8,953,284 B1 | 2/2015 | Mashima et al. |
| 9,299,369 B1 * | 3/2016 | Biskeborn ................ G11B 5/40 |
| 9,449,622 B2 | 9/2016 | Biskeborn et al. |
| 2002/0048114 A1 | 4/2002 | Dime et al. |
| 2002/0080522 A1 | 6/2002 | Sato et al. |
| 2003/0162344 A1 | 8/2003 | Ishii et al. |
| 2005/0068684 A1 | 3/2005 | Gill |
| 2009/0027812 A1 | 1/2009 | Noguchi et al. |
| 2009/0052093 A1 | 2/2009 | Kawakita et al. |
| 2009/0154020 A1 | 6/2009 | Fujii et al. |
| 2009/0262456 A1 * | 10/2009 | Dugas ................ G11B 5/00826 |
| | | 360/110 |
| 2009/0273859 A1 | 11/2009 | Flint et al. |
| 2009/0279212 A1 | 11/2009 | Engel et al. |
| 2009/0316309 A1 | 12/2009 | Partee et al. |
| 2010/0079908 A1 | 4/2010 | Heidmann |
| 2011/0116184 A1 | 5/2011 | Yasui et al. |
| 2011/0127994 A1 * | 6/2011 | Dmytriw .................. B82Y 25/00 |
| | | 324/207.11 |
| 2012/0307396 A1 * | 12/2012 | Biskeborn .......... G11B 5/00821 |
| | | 360/75 |
| 2013/0077189 A1 * | 3/2013 | Kato ..................... G11B 5/607 |
| | | 360/75 |
| 2013/0286502 A1 | 10/2013 | Erden et al. |
| 2014/0063644 A1 | 3/2014 | Lou et al. |
| 2014/0085748 A1 | 3/2014 | Biskeborn et al. |
| 2014/0087089 A1 | 3/2014 | Biskeborn et al. |
| 2014/0247519 A1 | 9/2014 | Takizawa et al. |
| 2016/0125900 A1 | 5/2016 | Biskeborn et al. |

FOREIGN PATENT DOCUMENTS

| | | |
|---|---|---|
| EP | 1416504 A2 | 5/2004 |
| WO | 0243164 A1 | 5/2002 |
| WO | 2009044447 A1 | 4/2009 |

OTHER PUBLICATIONS

Biskeborn et al., U.S. Appl. No. 14/527,695, filed Oct. 29, 2014.
Non-Final Office Action from U.S. Appl. No. 14/527,695, dated Oct. 7, 2015.
Biskeborn et al., U.S. Appl. No. 14/527,707, filed Oct. 29, 2014.
Non-Final Office Action from U.S. Appl. No. 14/527,707, dated Oct. 5, 2015.
Biskeborn et al., U.S. Appl. No. 14/527,713, filed Oct. 29, 2014.
Biskeborn et al., U.S. Appl. No. 13/624,466, filed Sep. 21, 2012.
Biskeborn et al., U.S. Appl. No. 13/624,484, filed Sep. 21, 2012.
Biskeborn et al., U.S. Appl. No. 14/053,514, filed Oct. 14, 2013.
Isogami et al., "30-nm Scale Fabrication of Magnetic Tunnel Junctions Using EB Assisted CVD Hard Masks," IEEE Transactions on Magnetics, vol. 41, No. 10, Oct. 2005, pp. 3607-3609.
List of IBM Patents or Patent Applications Treated as Related.
Mao, "Tunneling Magnetoresistive Heads for Magnetic Data Storage," Journal of Nanoscience and Nanotechnology, vol. 7, No. 1, 2007, pp. 1-12.
Nakashio et al., "Flux Guide Type Tunnel-Valve Head for Tape Storage Applications," IEEE Transactions on Magnetics, vol. 38, No. 5, Sep. 2002, pp. 1925-1927.
Peng et al., "On the geometry control of magnetic devices: Impact of photo-resist profile, shadowing effect, and material properties," Vacuum, vol. 84, 2010, pp. 1075-1079.
Statement of Relevance of Non-Translated Foreign Document WO2009044447.
Vopsaroiuet al., "A new magnetic recording read head technology based on the magneto-electric effect," Journal of Physics D: Applied Physics, vol. 40, 2007, pp. 5027-5033.
Notice of Allowance from U.S. Appl. No. 14/527,695, dated Dec. 24, 2015.
Ex Parte Quayle from U.S. Appl. No. 14/527,707, dated Apr. 7, 2016.
Notice of Allowance from U.S. Appl. No. 14/527,707, dated Jun. 6, 2016.

* cited by examiner

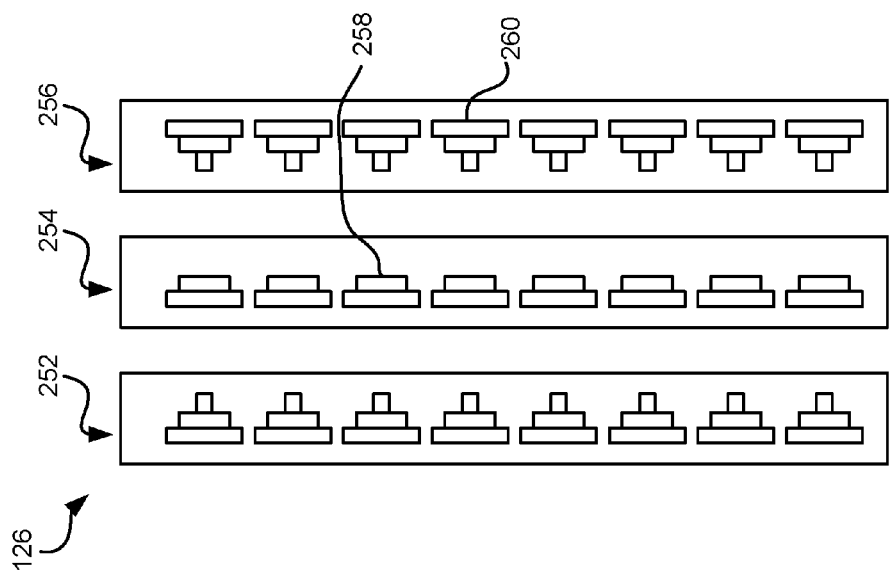
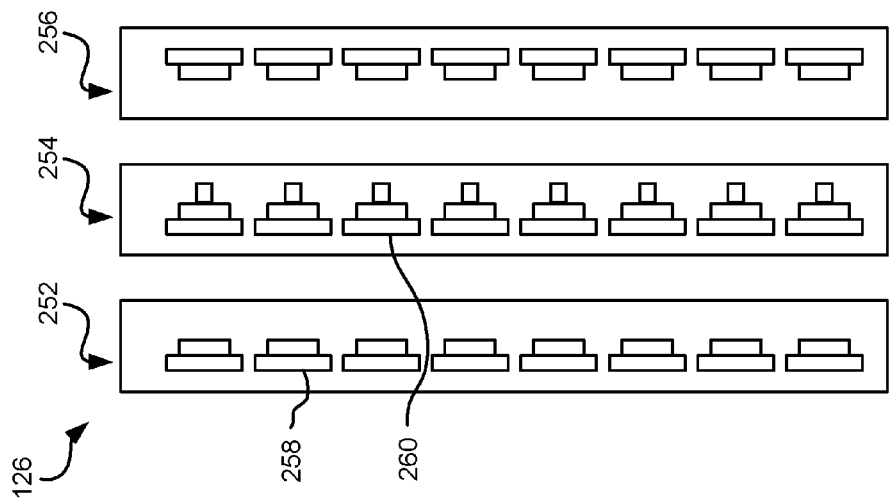

DIFFERING MAGNETIC READ SENSORS ON A MAGNETIC HEAD

BACKGROUND

The present invention relates to data storage systems, and more particularly, this invention relates to an apparatus such as a magnetic head having multiple different kinds of read sensors.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

An apparatus according to one embodiment includes a magnetic head having multiple magnetic transducers, the transducers including read sensors. The read sensors are of at least two differing types selected from a group consisting of tunneling magnetoresistance (TMR), giant magnetoresistance (GMR), anisotropic magnetoresistance (AMR), and inductive sensors.

An apparatus according to one embodiment includes a magnetic head having multiple magnetic transducers, the transducers including read sensors. The head is configured for linear magnetic recording. The read sensors are of at least two differing types selected from a group consisting of tunneling magnetoresistance (TMR), giant magnetoresistance (GMR), anisotropic magnetoresistance (AMR), and inductive sensors. The read sensors are on a single module.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a magnetic head having multiple magnetic transducers, the transducers including read sensors. The read sensors are of at least two differing types selected from a group consisting of tunneling magnetoresistance (TMR), giant magnetoresistance (GMR), anisotropic magnetoresistance (AMR), and inductive sensors.

In another general embodiment, an apparatus includes a magnetic head having multiple magnetic transducers, the transducers including read sensors. The head is configured for linear magnetic recording. The read sensors are of at least two differing types selected from a group consisting of tunneling magnetoresistance (TMR), giant magnetoresistance (GMR), anisotropic magnetoresistance (AMR), and inductive sensors. The read sensors are on a single module.

Figure 1A:
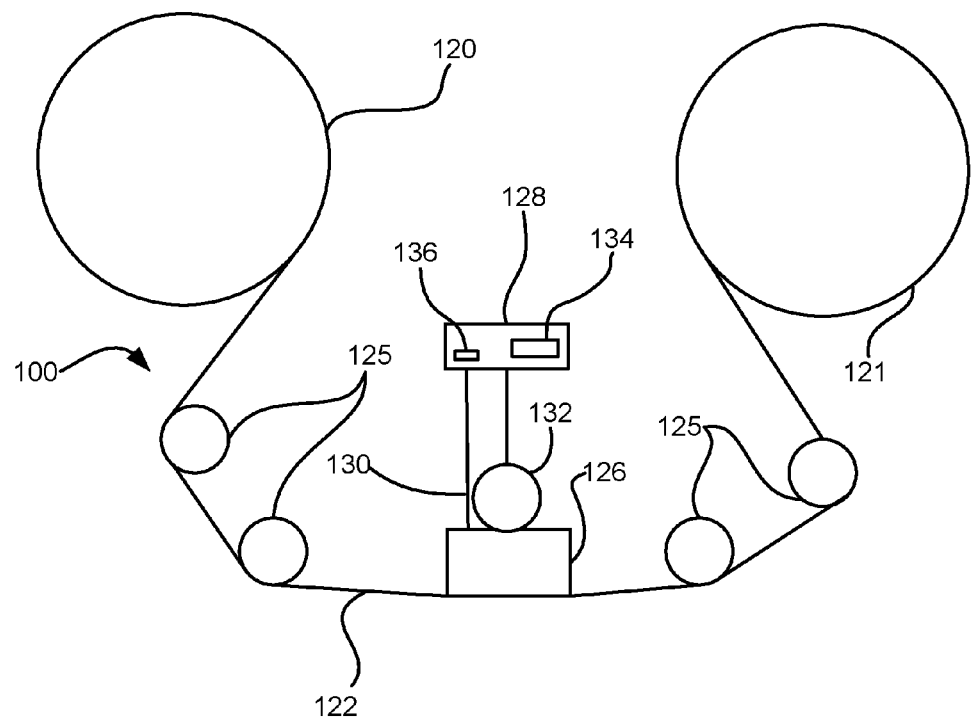
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers (used interchangeably with "read sensors" herein), writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
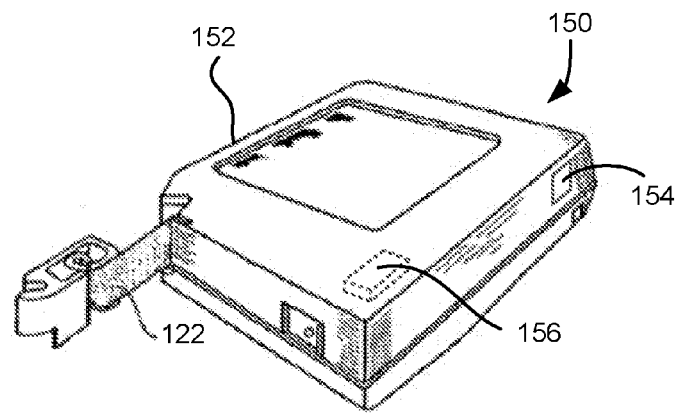
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
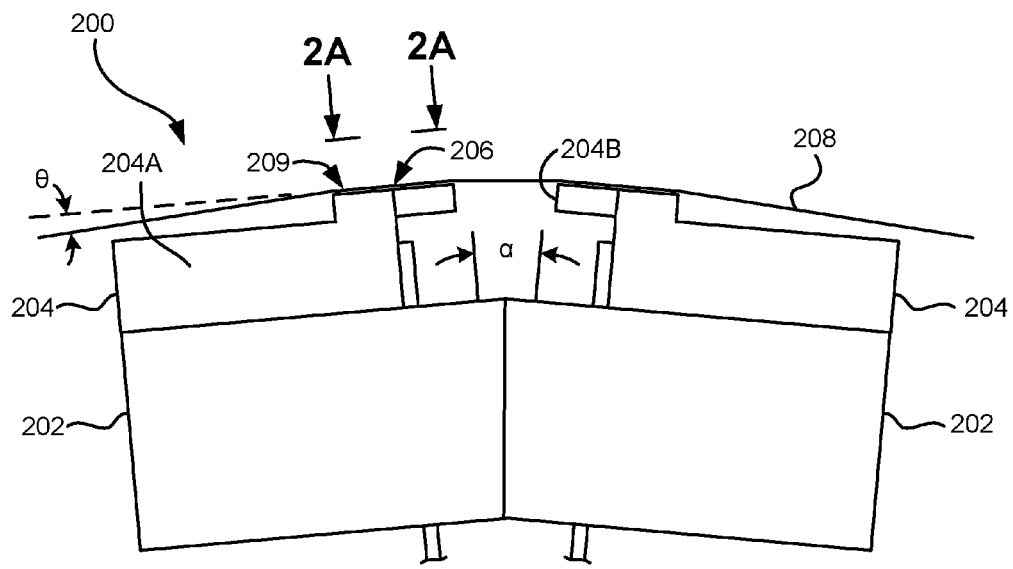
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive read sensor, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
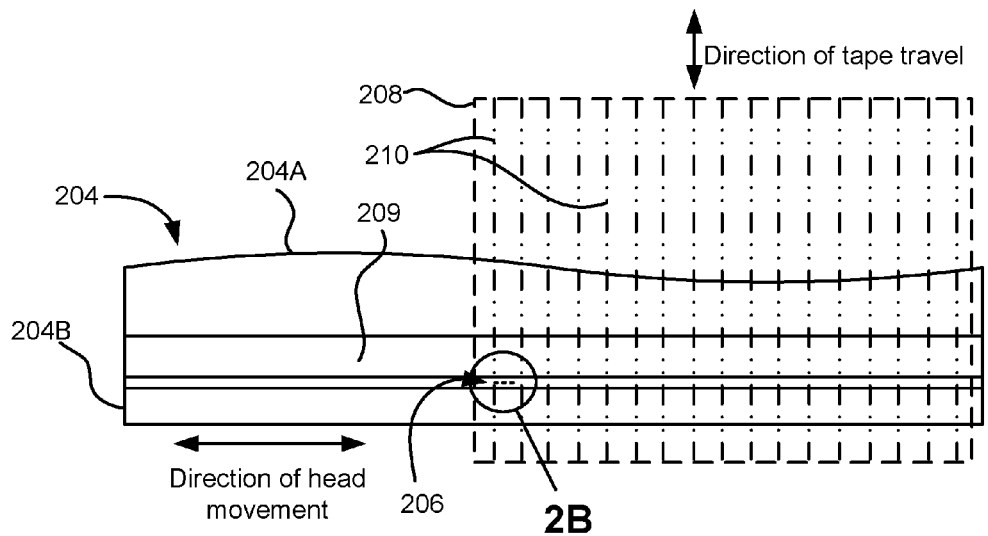
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
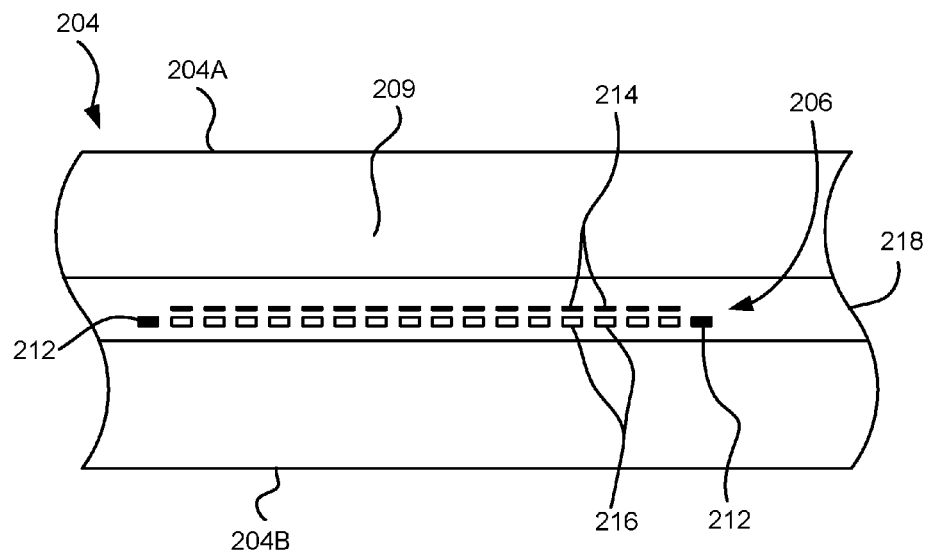
FIG. 2B is a detailed view taken from Circle 2B of FIG. 2A.

FIG. 2B depicts a plurality of readers and/or writers 206 formed in a gap 218 on the module 204 in Circle 2B of FIG.

2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
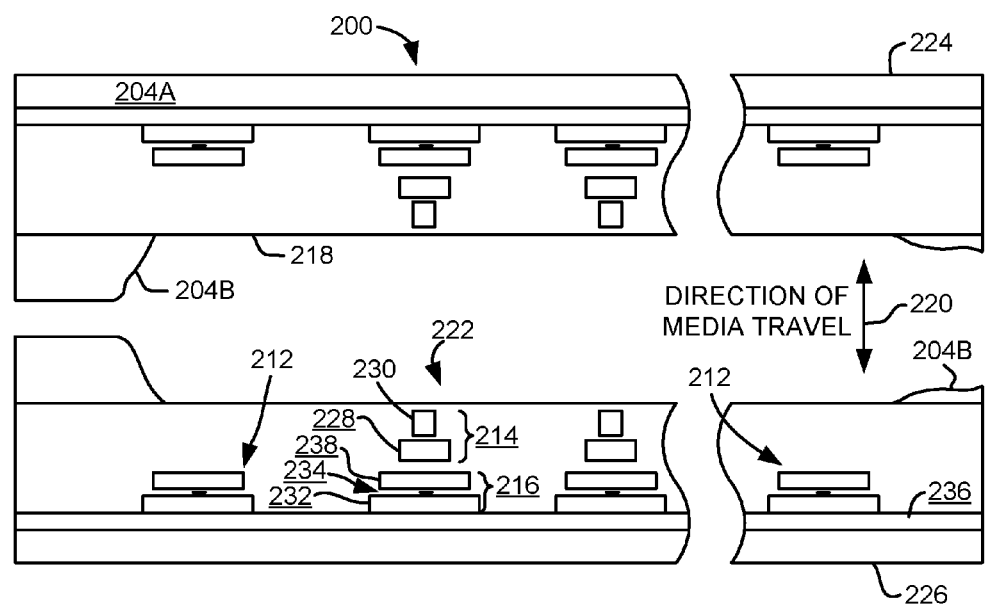
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, giant magnetoresistance (GMR), anisotropic magnetoresistance (AMR), tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
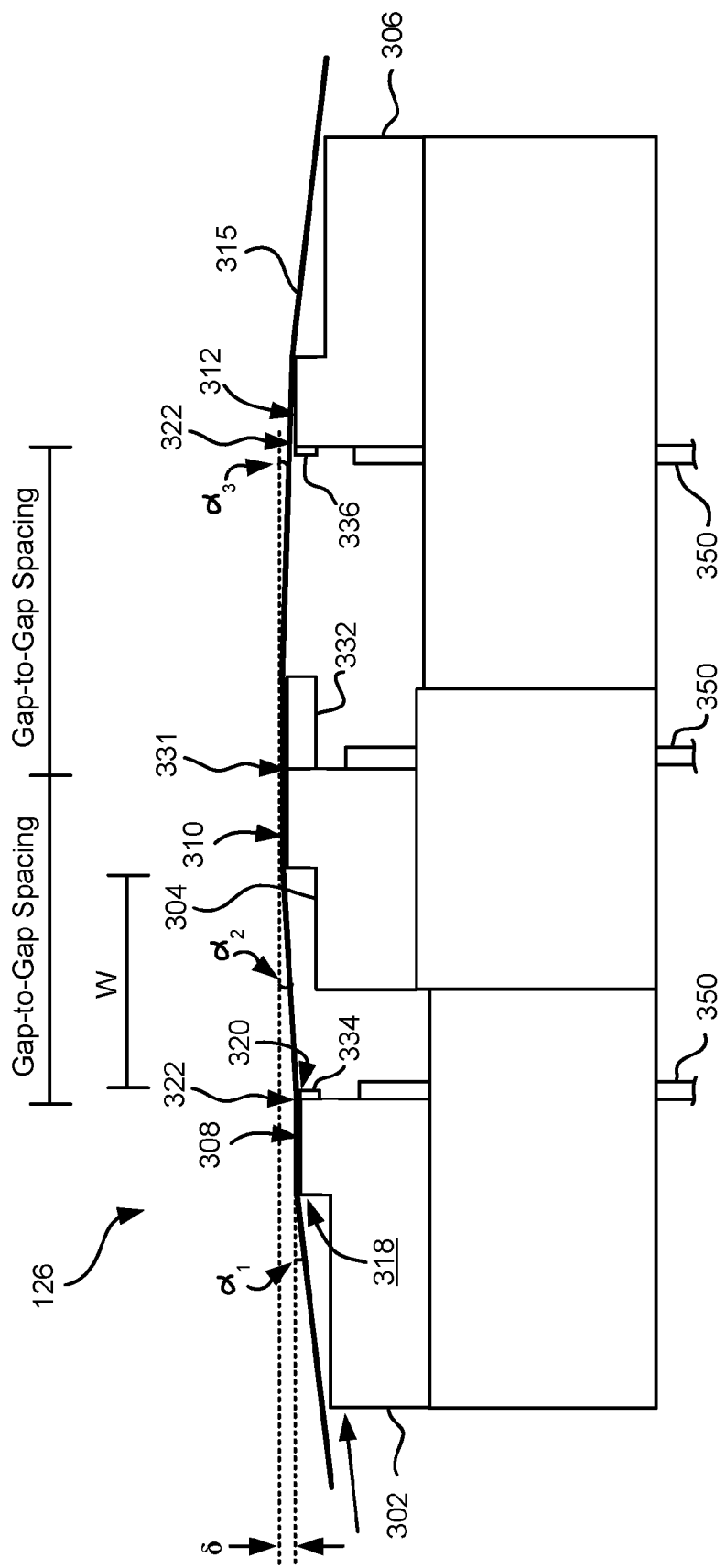
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
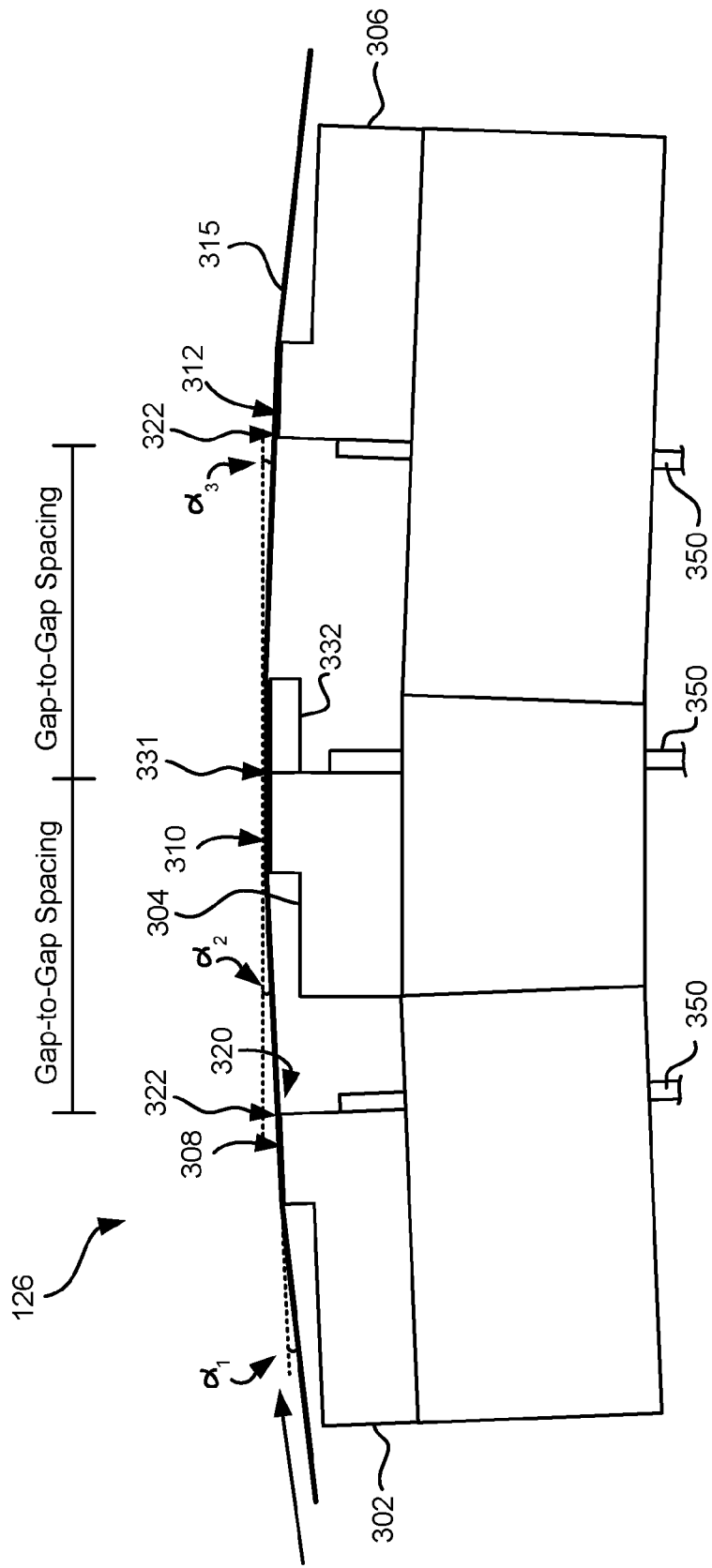
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
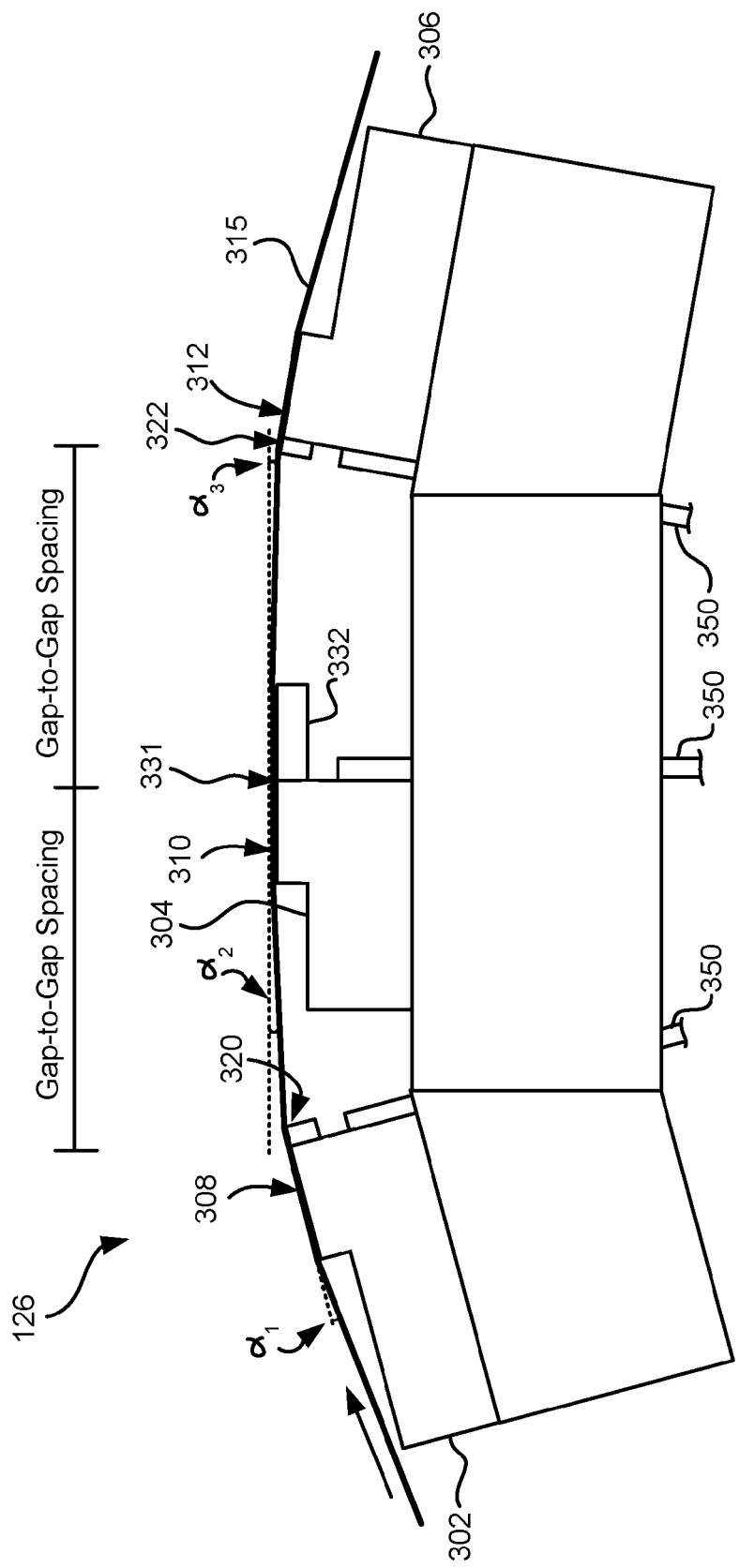
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Abrasion Resistant Barrier Layer

With continued reference to the above described apparatuses, it would be advantageous for tape recording heads to include tunnel valve sensor technology. Furthermore, with the continual decrease in data track width in magnetic storage technologies and continual increase in linear density, tunnel valve sensors enable readback of data in ultra-thin data tracks due to their high level of sensitivity in such small operating environments.

As will be appreciated by one skilled in the art, tunnel magnetoresistance (TMR) is a magnetoresistive effect that occurs with magnetic tunnel junctions. TMR sensors typically include two ferromagnetic layers separated by a thin, insulative, tunneling layer (also known in the art as a tunnel barrier layer) which, according to some of the embodiments described herein, may include a polycrystalline magnesium oxide layer. When the insulating layer is thin enough e.g., less than about 16 angstroms, electrons can tunnel from one ferromagnetic layer to the other ferromagnetic layer, passing through the insulating material and thereby creating a current. Variations in the current, caused by the influence of external magnetic fields from a magnetic medium on the free ferromagnetic layer of the TMR sensor, correspond to data stored on the magnetic medium.

It is well known that tunnel valve sensors are very susceptible to shorting during fabrication due to abrasive lapping particles that scratch/smear conductive material across the tunneling layer, thereby creating a short. Particularly, the lapping particles tend to plow through the ductile magnetic layer, smearing the metal across the tunneling layer, thereby creating an electrical short that diminishes the sensitivity of the sensor.

By analogy, scientists and engineers familiar with tape recording technology would not expect a tunnel valve sensor to remain operable (e.g., by not experiencing shorting) in a contact recording environment such as tape data storage, in which abrasive asperities embedded in the recording medium scrape across the thin tunneling layer during tape travel. This problem would be further exacerbated in that the tunnel valve sensors in a tape head are operating in an apparatus in which every one of the tunnel valve sensors is required to be simultaneously fully functional for operation to design specifications.

Furthermore, the potential use of TMR sensors in tape heads has heretofore been thought to be highly undesirable, as tape heads include multiple sensors, e.g., 16, 32, 64, etc., on a single die. If one or more of those sensors becomes inoperable due to the aforementioned shorting, the head becomes defective and typically would need to be discarded and/or replaced for proper operation of the apparatus.

Conventional current in plane-type tape heads require at least two shorting events across different parts of the sensor which are typically electrically isolated from the sensor by relatively thick insulation layers in order to affect the sensor output, and therefore such heads are far less susceptible to shorting due to scratches. In contrast, tape heads with tunnel valve sensors may short with a single event, which is another reason that tunnel valve sensors have not been adopted into contact recording systems.

Figure 8A:
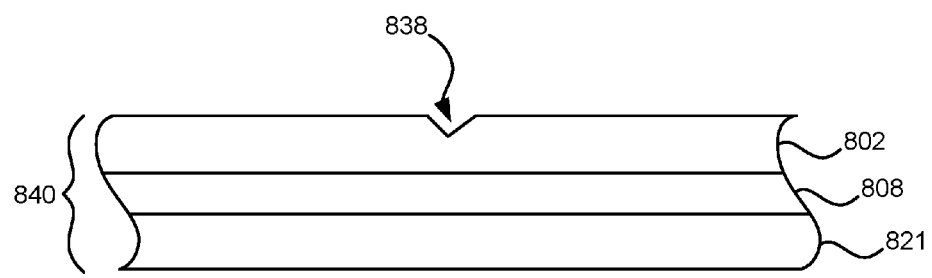
FIG. 8A is a partial cross sectional view of tape bearing surface damage on an abrasion resistant barrier.

FIG. 8A illustrates a partial cross-sectional view of a scratch 838 on an abrasion resistant barrier layer 802 of a protective overcoat 840 according to one embodiment. Unlike conventional tape head overcoats, the barrier layer 802 prevents scratches 838 from wearing deeper than the barrier layer 802, regardless of asperities that may be on a tape being read and/or written to. Because the scratches 838 are contained within the barrier layer 802, the shorting problems due to scratching/smearing are also alleviated. Furthermore, damage, e.g. scratches/smears 838, etc. of layers of the overcoat 840 under the barrier layer 802, is also alleviated in embodiments described herein.

The protective overcoat 840 may include one or more additional layers, such as an insulating layer 808. According to one embodiment, the overcoat 840 may further include an adhesion layer 821 below the barrier layer 802, to prevent delamination of layers of the overcoat 840. The adhesion layer may be a material known in the art.

It follows that various embodiments described herein include an abrasion resistant layer for multichannel tape recording heads. The aforementioned abrasion resistant layer enables multichannel tape recording heads to withstand the passage of asperities on the moving recording medium that otherwise would scratch the tape head, and likely short out a sensor thereof, especially where such sensor is a TMR sensor.

Figure 8B:
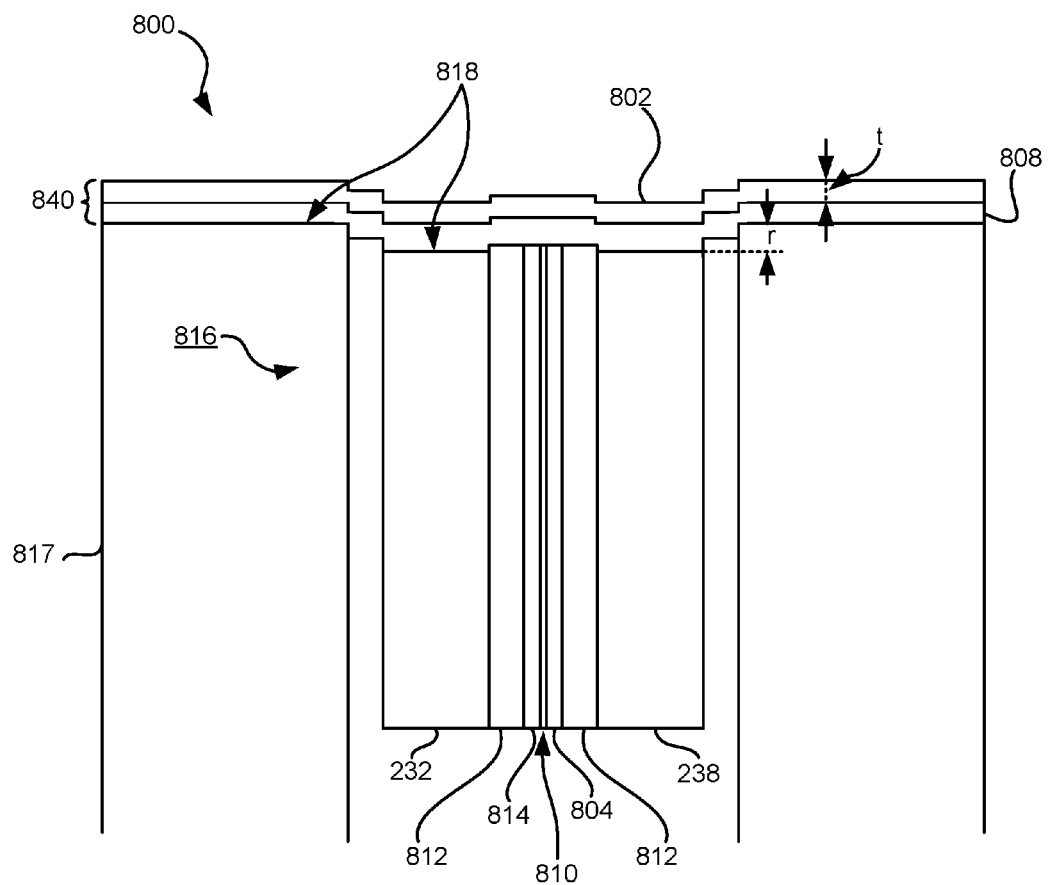
FIG. 8B is a side view of a multichannel tape recording assembly with tunnel valve sensors.

FIG. 8B depicts a head assembly 800 for multichannel tape recording, in accordance with one embodiment. As an option, the present head assembly 800 may be implemented in conjunction with features from any other embodiment listed herein, such as those described with reference to the other FIGS. Of course, however, such head assembly 800 and others presented herein may be used in various applications and/or in permutations which may or may not be specifically described in the illustrative embodiments listed herein. Further, the head assembly 800 presented herein may be used in any desired environment.

Referring now to FIG. 8B, head assembly 800 includes an array of sensors 816, in this example, tunneling magnetoresistance sensors. Although only one tunneling magnetoresistance sensor 816 is shown in FIG. 8B, multiple sensors may be configured in an array such as that shown in FIG. 2B or according to any of the other embodiments described herein.

Head assembly 800 of FIG. 8B additionally includes a first magnetic shield 232 and second magnetic shield 238, such as those introduced and described previously (see FIG. 2C description). The sensor 816, positioned between the first magnetic shield 232 and the second magnetic shield 238, includes a reference layer 814, a tunneling layer 810, and a free layer 804 of a type known in the art. Optionally, electrically conductive, nonmagnetic spacers 812 may separate the magnetic shields from the reference layer 814 and the free layer 804.

As illustrated in FIG. 8B, each of the tunneling magnetoresistance sensors 816 have a tape facing surface 818. Above each of the tape facing surfaces 818 of the tunneling magnetoresistance sensors 816 is a protective overcoat 840 which includes at least a barrier layer 802. In some embodiments, the entire structure 840 is the barrier layer.

The overcoat 840 may include more than one layer, e.g. a barrier layer 802 and one or more supplemental layers, e.g., insulating layer 808, an adhesion layer, etc., depending on the embodiment, as will be described below.

The barrier layer 802 of the head assembly 800 serves as an abrasion resistant layer for protecting multichannel tape recording heads from hard asperities that pass across the recording heads due to tape travel. Although the barrier layer 802 preferably includes enhanced abrasion resistance, in some embodiments a barrier layer may have both enhanced abrasion resistance and wear resistance, e.g., showing minimal wear after passing a substantial amount of tape across the barrier layer 802. Furthermore, the barrier layer may be processed with additives for enhanced lubricity such as islands of known lubricating material.

Preferably, the barrier layer 802 has a hardness and fracture toughness that about matches, and preferably exceeds that of the tape medium, so that the asperities of the tape medium do not scratch the barrier layer 802. To achieve this, the barrier layer 802 includes at least one at least partially polycrystalline layer. The polycrystalline nature of the barrier layer 802 should not be confused with a single crystal structure. Rather, the polycrystalline material is a solid that is comprised of many crystallites which may have varying sizes and orientations. The orientations thereof may be random or directed in various embodiments.

Although the barrier layer 802 may include a single at least partially polycrystalline layer in some embodiments, other embodiments may include at least two, at least three, multiple, etc. at least partially polycrystalline layers in a laminate.

According to some embodiments, the polycrystalline barrier layer 802 may include a metal oxide. According to further embodiments, the polycrystalline barrier layer 802 may include an oxygen-enriched metal oxide. Thus, in some embodiments, the barrier layer 802 may include an at least partially polycrystalline oxidized metal. According to various embodiments, the oxygen-enriched characteristic of the metal oxide is what promotes polycrystalline characteristics, which further enhances the abrasion resistant qualities of the barrier layer 802. Furthermore, an oxygen-enriched metal oxide may be defined as a material that does not have an oxygen deficiency. For example, a metal oxide barrier layer may be considered oxygen-enriched if it is stoichiometric or has an oxygen concentration slightly higher than a stoichiometric ratio. An oxygen-enriched metal oxide may be formed by sputter deposition.

The abrasion/wear of a barrier layer 802 may vary depending on the barrier layer's 802 metal composition.

According to one embodiment, the oxygen-enriched metal oxide may be an oxide of aluminum. According to another embodiment, the oxygen-enriched metal oxide may be an oxide of titanium. According to a further embodiment, the oxygen-enriched metal oxide may be an oxide of chromium. The oxygen-enriched metal oxide may vary depending on the embodiment, and should not be limited to those described herein.

According to some embodiments, the barrier layer may have a material composition corresponding to the material composition of the tape. For example, the composition of the barrier layer may be selected based on the material composition of the tapes for which the head is intended. For example, if the head is intended for use with chromium-containing tape media, the barrier layer may include chromium oxide, which may or may not be oxygen-enriched.

According to one embodiment, an upper surface of a polycrystalline barrier layer is polished for enhancing an abrasion resistance thereof. This polishing enhances the density of and furthermore increases the fracture resistance of the barrier layer 802. Furthermore, according to one embodiment, the polishing of the polycrystalline barrier layer may be done in order to remove any residual layers on top of the top polycrystalline layer that may not be of polycrystalline quality and in this case the thickness of the unpolished film may be adjusted accordingly.

Methods of manufacture of polycrystalline barrier layers will be described below.

With continued reference to FIG. 8B, according to various embodiments, the barrier layer 802 is at least 2 nm thick, and preferably at least 5 nm thick form some magnetic recording media. Furthermore, the barrier layer 802 is preferably at most 20 nm thick. Barrier layer thicknesses (noted by 't' in FIG. 8B) may vary depending on embodiment variables including spacing loss tolerance, stress distribution, etc.

The inventors have surprisingly and unexpectedly found that a 5 nm thick or thicker barrier layer is denser than a barrier layer of less than 5 nm thick but formed under identical conditions. Typically one would have expected the density to remain constant regardless of the thickness of formation. During experimentation, the inventors found that barrier layers thinner than 5 nm were worn away quickly by tape. However, upon trying thicker barrier layers, the durability thereof was found to be significantly greater. Upon investigation as to why, the inventors surprisingly and unexpectedly discovered the higher density of the thicker layers. Furthermore, it would not seem advantageous in conventional sensors to design a thicker (e.g. 5 nm or greater) barrier layer 802 due to spacing losses; however the advantage of the unexpected increased density, and thus durability, counterbalances the spacing loss.

While conventional coatings have been designed to minimize the spacing between MR, AMR, and GMR sensor types and a magnetic medium, various embodiments herein for TMR sensors are able to achieve desirable transducer performance despite the barrier layer thicknesses 't' being not necessarily optimal for reducing spacing loss. Thus, barrier layers 802 above TMR sensors, as described in various embodiments herein, preferably have a thickness 't' (see FIG. 8B) greater than 2 nm. Despite the increased thickness of the barrier layer, the TMR sensors are able to achieve desirable reading and/or writing performance due to the improved sensitivity of the TMR sensors, particularly compared to conventional sensors used on tape heads.

As noted above, one or more supplemental layers may be provided in the protective overcoat 840, e.g., of FIGS. 8A and/or 8B. For example, referring to FIG. 8B, and assuming for this example that the barrier layer 802 is metallic, head assembly 800 also includes an insulating layer 808 of a type known in the art between the barrier layer 802 and the tape facing surfaces 818 of the tunneling magnetoresistance sensors 816. The insulating layer 808 prevents shorting of head current flow through the barrier layer 802 when the barrier layer 802 is electrically conductive.

As illustrated in FIG. 8B, portions of the tape bearing surfaces of the tunneling magnetoresistance sensors 816 may be recessed from a plane of the tape facing surface 818 of the substrate 817 of the tunneling magnetoresistance sensors 816. According to one embodiment, the average recession r is at least 2 nm. The depth of the recession r may vary depending on the embodiment.

Furthermore, the barrier layer 802 may be recessed along the tape facing surfaces 818 as shown in FIG. 8B.

Figure 8C:
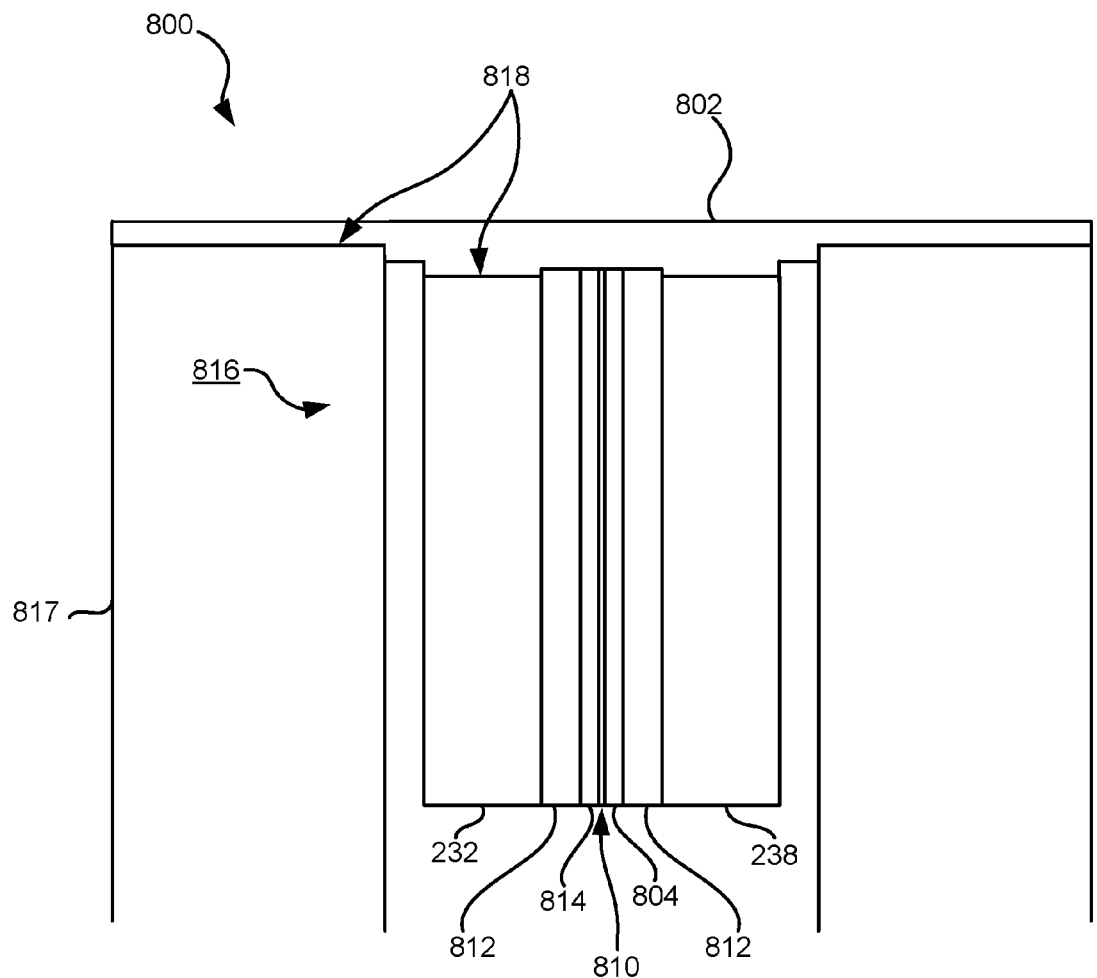
FIG. 8C is a side view of a multichannel tape recording assembly with tunnel valve sensors according to yet another embodiment.

In further embodiments, the barrier layer 802 may not be recessed along the tape facing surfaces 818. Referring to FIG. 8C, in one embodiment, the barrier layer 802 is formed above the tape facing surfaces 818 and planarized, e.g., by polishing. Moreover, the thickness of the barrier layer 802 may be adjusted by polishing. Such polishing has been found to render a very dense film. Note that the optional insulating layer 808 is not present in the illustrative embodiment shown, but may be present if desired.

Various examples of manufacture of the above described oxygen-enriched metal oxides will now be described below. According to one embodiment, the barrier layer 802 described above may be applied above at least the tape facing surfaces 818 of the tunneling magnetoresistance sensors via sputtering techniques with processing conditions that would create the oxygen-enriched metal oxide. Such processing conditions may be readily ascertained by one of ordinary skill in the art without resorting to undue experimentation once being informed of the teachings herein.

According to a further embodiment, the barrier layer 802 described above may be applied above at least the tape facing surfaces 818 of the tunneling magnetoresistance sensors via deposition of, or otherwise promoting the formation of, the oxide portion, and then using ion bombardment to promote conversion to polycrystalline form. For example, the oxide portion may be formed by depositing metal in an oxygen-rich environment, using a method known in the art, onto the tunneling magnetoresistance sensor according to one embodiment.

According to exemplary embodiments, an oxidized region and/or a polycrystalline portion may be formed by implementing various embodiments described in U.S. patent application Ser. No. 13/624,466, filed on Sep. 21, 2012 and U.S. patent application Ser. No. 13/624,484, filed on Sep. 21, 2012, which are herein incorporated by reference.

According to yet a further embodiment, the barrier layer 802 described above may be applied above at least the tape facing surfaces 818 of the tunneling magnetoresistance sensors via forming a metal barrier layer 802, and then at least partially oxidizing the barrier layer 802. For example, after the metal barrier layer 802 is formed, the metal barrier layer 802 may then receive passive oxidation, active oxidation, etc. in order to complete the partial or full oxidation process. In another embodiment, the oxygen content of the barrier layer being deposited can be adjusted by changing a processing parameter, such as changing the sputtering target to one of a different composition, varying the oxygen concentration in the deposition chamber, etc.

Full passive oxidation of a metal barrier layer 802 may include allowing the metal barrier layer to fully oxidize over a period of time via exposing the at least partially oxidized metal barrier layer 802 to room air, outside air, standard air, etc. Active oxidation of the metal barrier layer 802 may be performed using a technique known in the art e.g. reactive ion etching (RIE), exposure to plasma, plasma vapor deposition, etc.

According to various embodiments, the barrier layer may include a primarily unoxidized metallic layer, e.g., less than 25 vol % of the metal is oxidized. Depending on the embodiment, this primarily unoxidized metallic layer could be under an oxidation front, may be a separate layer formed prior to deposition of the polycrystalline layer, etc. Additionally according to one embodiment, there may be an insulating layer under the primarily unoxidized metallic layer to electrically isolate the metallic layer from the sensor. The insulating layer may be applied to the tape head by a method known in the art.

In an exemplary embodiment, the barrier 840 is sputtered directly onto the head surface. In this embodiment, the head surface is first ion milled using, for example, an ionized argon beam. Angling the beam by about 60 degrees relative to normal to the head surface enhances the likelihood of crystalline sapphire formation.

With continued reference to the polycrystalline layer described above, according to one embodiment, the at least one polycrystalline layer includes an at least partially epitaxial polycrystalline aluminum oxide, where said layer is preferably oxygen enriched. In another embodiment, the at least one polycrystalline layer includes an at least partially epitaxial polycrystalline stoichiometric aluminum oxide, where said layer is preferably oxygen enriched.

Depending on the structural alignment of a supplemental layer (described above) with respect to the polycrystalline layer, the polycrystalline structure the supplemental layer may extend through the polycrystalline layer, thereby forming an at least partially polycrystalline structure therewith.

There has thus been described various embodiments of an abrasion resistant layer that enables multichannel tape heads to withstand the passage of asperities on a moving recording medium that would otherwise scratch the sensor(s) therein.

Heads with Multiple Sensors Having Differing Sensor Technologies

With continued reference to concerns/issues that arise from the ongoing transition of magnetic recording devices to be more advanced, have higher areal density formats, smaller sizes, etc., implementing read sensors (used interchangeably with "readers" herein) having differing sensor technologies on the same head may prove favorable, as will be described below.

Implementing multiple sensor technologies on the same recording head enables backward compatibility as the combined and/or independent reading of multiple read sensors may be able to read previous generation head/density formats, which may, for example, use media having significantly different magnetic and/or spacing characteristics. Moreover, advanced, narrower read sensors may not be able to read previous generation tapes effectively.

Figure 9:
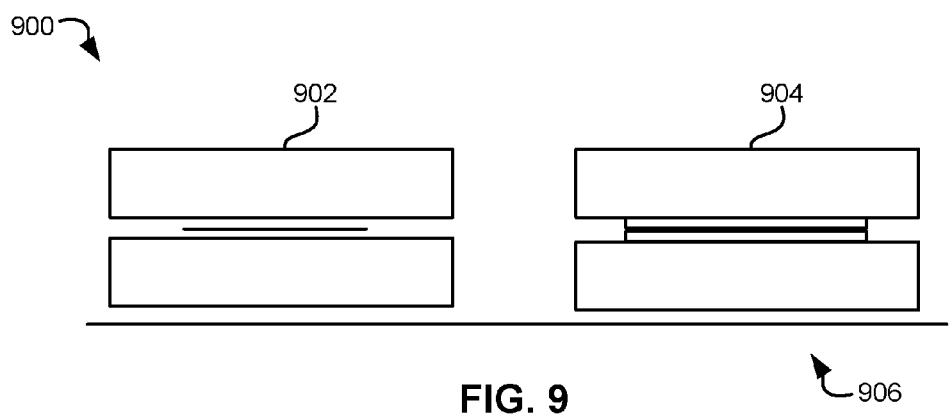
FIG. 9 is a side view of a multichannel tape recording assembly having read sensors of different types.

FIG. 9 depicts an apparatus 900 having a magnetic head configuration in accordance with one embodiment. As an option, the present apparatus 900 may be implemented in conjunction with features from any other embodiment listed herein, such as those described with reference to the other FIGS. Of course, however, such apparatus 900 and others presented herein may be used in various applications and/or in permutations which may or may not be specifically described in the illustrative embodiments listed herein. Further, the apparatus 900 presented herein may be used in any desired environment.

Referring now to FIG. 9, the apparatus 900 includes a magnetic head configuration having multiple read sensors which may also be referred to as readers and/or read transducers herein. The read sensors may be of any type known in the art. Illustrative sensor types include GMR, AMR, TMR, inductive read sensors, etc. Furthermore, the magnetic head of apparatus 900 may be configured for use with a linear magnetic recording tape.

As illustrated in FIG. 9, the multiple read sensors 902, 904 of differing types, here by way of example only, GMR and TMR, are on a single module 906. Although apparatus 900 illustratively includes GMR and TMR sensors 902 and 904 (respectively), as noted above, module 906 may also or alternatively include AMR sensors, inductive sensors, etc.

As previously described, conventional modules include only a single type of sensor, and thus are limited in many respects, e.g. especially in lieu of the ongoing transition of magnetic recording devices to be more advanced, have higher areal density formats, smaller sizes, etc. Implementing multiple sensor technologies, using embodiments described herein, on the same recording head meets this potential and alleviates the concerns described above.

Furthermore, due to their similar construction, GMR and TMR sensors may be fabricated nearly concurrently on the same wafer sharing some processing steps, and later diced into modules having read sensors of differing types. TMR sensors have proven useful for a number of reasons e.g. due to their large output while GMR sensors are useful for a number of reasons e.g. they can be fabricated in a very robust manner, etc., and thus the combination of multiple read sensors on the same magnetic head may be advantageous.

As described above, at least two of the read sensors are of differing types, e.g. as illustrated in FIG. 9 by GMR sensor 902 and TMR sensor 904. Although FIG. 9 includes two read sensors (GMR sensor 902 and TMR sensor 904), further embodiments may include three read sensors, four read sensors, five read sensors, etc. as will now be described in greater detail below.

Figure 10:
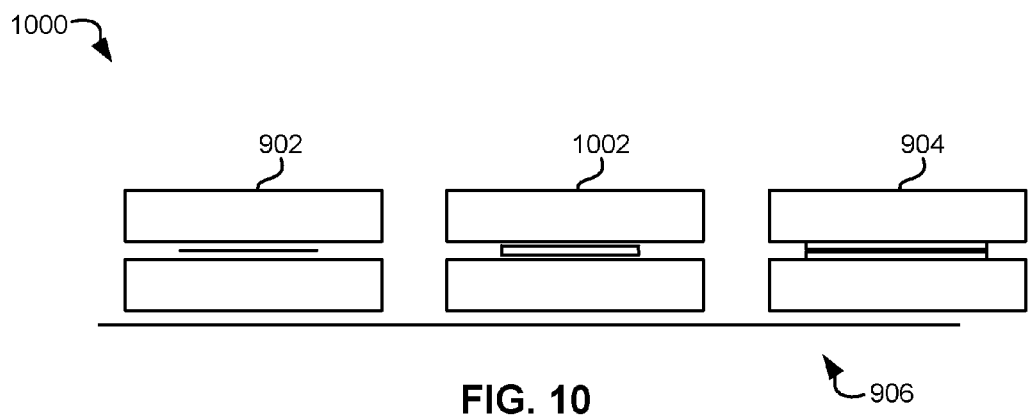
FIG. 10 is a side view of a multichannel tape recording assembly having read sensors of different types.

FIG. 10 depicts an apparatus 1000 having a magnetic head configuration in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment.

Referring now to FIG. 10, the apparatus 1000 includes a magnetic head configuration with three read sensors (e.g., GMR sensor 902, AMR sensor 1002 and TMR sensor 904) of differing types on the same module 906.

Again, it should be noted that although FIG. 10 includes TMR, GMR, and AMR sensors 902, 1002 and 904 (respectively) as noted above, module 906 may also and/or alternatively include e.g. inductive sensors, etc.

According to some embodiments, the read sensors may include data sensors and/or servo sensors e.g., as shown in FIGS. 2B-2C. The servo sensors and the data sensors are of differing types in some embodiments, but in other embodiments, some of the data sensors and the servo sensors may be of the same type depending on the embodiment. Moreover, at least some of the servo sensors are of differing type than at least some the data sensors. Numerous sensor configurations will now be described below.

Figure 11A:
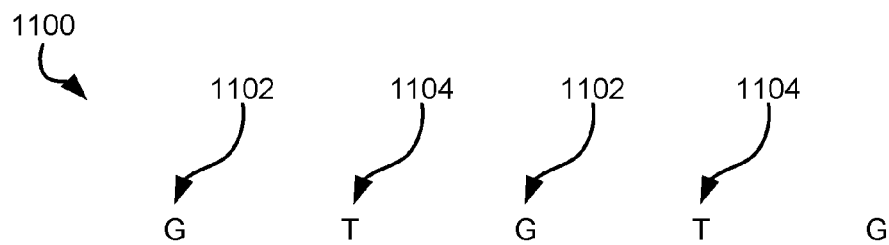
FIG. 11A is an interleaved array of sensor technologies.
Figure 11B:
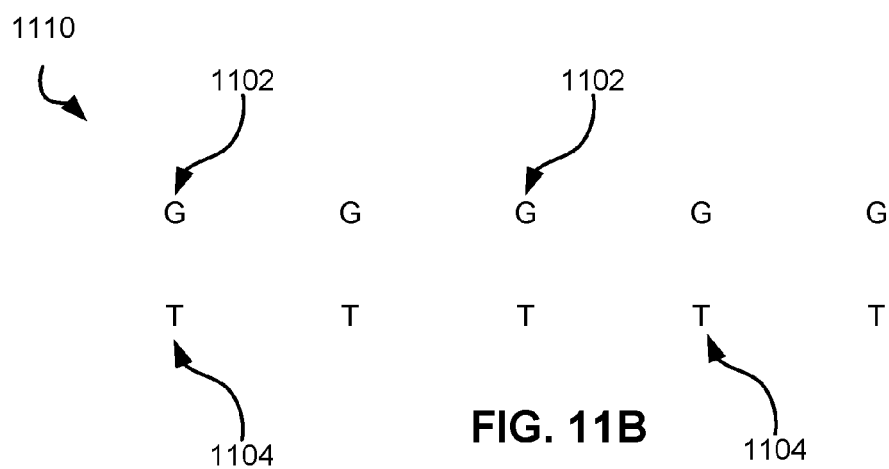
FIG. 11B is a stacked array of sensor technologies.
Figure 11C:
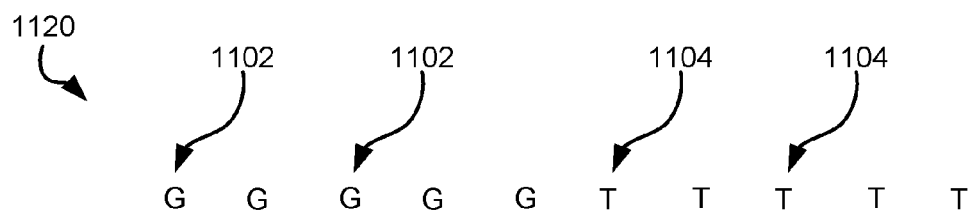
FIG. 11C is a laterally disposed array of sensor technologies.

FIGS. 11A-11C depict sensor configurations 1100, 1110 and 1120, in accordance with various embodiments. As an option, the present sensor configurations 1100, 1110 and 1120 may be implemented in conjunction with features from any other embodiment listed herein, such as those described with reference to the other FIGS. Of course, however, such sensor configurations 1100, 1110 and 1120 and others presented herein may be used in various applications and/or in permutations which may or may not be specifically described in the illustrative embodiments listed herein. Further, the sensor configurations 1100, 1110 and 1120 presented herein may be used in any desired environment.

Referring now to FIG. 11A, sensor configuration 1100 illustrates read sensors of differing types, here illustratively shown as GMR sensors 1102 and TMR sensors 1104, in an interleaved configuration. The read sensors are oriented in a single array which may be positioned on a single module.

Looking to sensor configuration 1110 of FIG. 11B, stacked arrays of differing types of read sensors, here illustratively depicted as GMR sensors 1102 and TMR sensors 1104, are illustrated according to another embodiment. According to the present configuration, the arrays of read sensors 1102, 1104 may be positioned on separate modules. According to yet another embodiment, sensor configuration 1120 of FIG. 11C illustrates laterally disposed arrays of differing types of read sensors, again illustratively depicted as GMR sensors 1102 and TMR sensors 1104, e.g., which may be positioned on a common module.

It should be noted that the e.g. spacing between read sensors, stacked array sensor alignment, order of read sensors, etc. of sensor configurations described herein and illustrated in FIGS. 9-11C are for exemplary purposes and may vary depending on the preferred embodiment. Furthermore, sensor configurations 1100, 1110 and 1120 include GMR sensors 1102 and TMR sensors 1104, which has been done by way of example only and should not be limited thereto. As previously described, the read sensors may be selected from a group consisting of TMR sensors, GMR sensors, AMR sensors, inductive sensors, etc.

Use of a particular sensor array may vary depending on the embodiment. The use of a particular type or array of read sensors of a module may be controlled by a controller via numerous criteria and/or methods including but not limited to e.g. based on a determined tape format, based on the logic of multiplexers, etc.

According to a further embodiment, the multiple read sensors described above may be on two different modules of the tape head. Furthermore, according to one embodiment, the two modules are identical, with read sensors described herein e.g. selected from a group consisting of TMR, GMR, AMR, inductive sensors, etc. on the two modules. In another embodiment, the read sensors may include data sensors and servo sensors, where the servo sensors and the data sensors are of the differing types. The modules may be arranged in a read-while-write configuration.

Furthermore, according to one embodiment, the magnetic head of apparatus 900 may include at least three modules, e.g., see FIGS. 4-7. In such embodiments including at least three modules, the read sensors e.g. GMR sensor 902, TMR sensor 904, etc. of the magnetic head may be positioned on one of the modules and/or on at least two of the modules.

In yet further embodiments, the magnetic head of apparatus 900 may include four modules. In such embodiments, a fourth module may include read sensors having a greater width in a cross track direction than the read sensors of the other modules. Furthermore, modules that include differing read sensors may include more than one sensor with a greater width in a cross track direction than the read sensors of the other modules.

With continued reference to embodiments of magnetic heads that include more than one module, according to one embodiment, one of the modules has data sensors and writers, wherein the other of the modules has no writers.

Conventional techniques may be used to fabricate the various read sensors. Furthermore, common process steps may be shared for the multiple sensor types. For example, embodiments which implement multiple sensor types in a common array of read sensors as described herein may be formed by co-plating the shields thereof as would be appreciated by one skilled in the art upon reading the present description.

It will be clear that the various features of the foregoing systems and/or methodologies may be combined in any way, creating a plurality of combinations from the descriptions presented above.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a magnetic head having at least eight magnetic transducers and at least one servo sensor, the transducers including read sensors arranged in a single array,
wherein the read sensors in the array of read sensors are of at least two differing types selected from a group consisting of tunneling magnetoresistance (TMR), giant magnetoresistance (GMR), anisotropic magnetoresistance (AMR), and inductive sensors; and
an abrasion resistant layer on a media facing side of the array, the abrasion resistant layer having an at least partially polycrystalline barrier layer formed of a metal oxide having an oxygen to metal ratio that is stoichiometric or higher than stoichiometric,
wherein the barrier layer is electrically conductive,
wherein the abrasion resistant layer further comprises an insulating layer laminated between the barrier layer and the array of read sensors.

2. An apparatus as recited in claim 1, wherein the read sensors are on a single module.

3. An apparatus as recited in claim 2, wherein the read sensors are interleaved along the array.

4. An apparatus as recited in claim 2, wherein the read sensors are in laterally disposed sub-arrays within the array.

5. An apparatus as recited in claim 1, wherein the read sensors are formed on a common substrate.

6. An apparatus as recited in claim 1, comprising a second array of magnetic transducers on a different module of the magnetic head, the second array having a plurality of read sensors.

7. An apparatus as recited in claim 6, wherein the read sensors in the second array are of at least one of the types.

8. An apparatus as recited in claim 7, wherein at least one of the modules is used only for reading data.

9. An apparatus as recited in claim 1, wherein the magnetic head is configured for linear magnetic recording on a magnetic recording tape.

10. An apparatus as recited in claim 1, wherein the magnetic head has at least three modules, the read sensors being on at least two of the modules.

11. An apparatus as recited in claim 10, wherein the modules are arranged in a read-while-write configuration.

12. An apparatus as recited in claim 1, wherein the magnetic head has two modules, the two modules being identical, the read sensors being on the two modules.

13. An apparatus as recited in claim 1, wherein the magnetic head has four modules, wherein a fourth of the modules has read sensors having a greater width in a cross track direction than the read sensors of the other modules.

14. An apparatus as recited in claim 1, wherein each of the read sensors in the array has a unique pair of shields positioned above and below the associated read sensor, the pairs of shields being spaced from one another along a longitudinal axis of the array.

15. An apparatus as recited in claim 1, further comprising:
a drive mechanism for passing a magnetic medium over the magnetic head; and
a controller electrically coupled to the magnetic head.

16. An apparatus, comprising:
a magnetic head having multiple magnetic transducers, the transducers including read sensors arranged in an array; and
an abrasion resistant layer on a media facing side of the array, the abrasion resistant layer having an at least partially polycrystalline barrier layer formed of a metal oxide having an oxygen to metal ratio that is stoichiometric or higher than stoichiometric,
wherein the barrier layer is electrically conductive,
wherein the abrasion resistant layer further comprises an insulating layer laminated between the barrier layer and the array of read sensors,
wherein the magnetic head is configured for linear magnetic recording on a magnetic recording tape,
wherein the read sensors are of at least two differing types selected from a group consisting of tunneling magnetoresistance (TMR), giant magnetoresistance (GMR), anisotropic magnetoresistance (AMR), and inductive sensors,
wherein the array of read sensors is on a single module,
wherein each of the read sensors in the array has a unique pair of shields positioned above and below the associated read sensor, the pairs of shields being spaced from one another along a longitudinal axis of the array.

17. An apparatus as recited in claim 16, further comprising:
a drive mechanism for passing a magnetic medium over the magnetic head; and
a controller electrically coupled to the magnetic head.

* * * * *